US010838088B2

United States Patent
Xu et al.

(10) Patent No.: US 10,838,088 B2
(45) Date of Patent: Nov. 17, 2020

(54) APPARATUS, DEVICE AND METHOD FOR MEASURING GAIN OF SENSOR

(71) Applicant: ZHONGPAI S&T (SHENZHEN) CO., LTD, Shenzhen (CN)

(72) Inventors: Jianfeng Xu, Wuhan (CN); Zhixiang Zhao, Shanghai (CN); Qiu Huang, Shanghai (CN); Qiyu Peng, Wuhan (CN)

(73) Assignee: ZHONGPAI S&T (SHENZHEN) CO., LTD, Shenzhen (CN)

( * ) Notice: Subject to any disclaimer, the term of this patent is extended or adjusted under 35 U.S.C. 154(b) by 306 days.

(21) Appl. No.: 16/004,290

(22) Filed: Jun. 8, 2018

(65) Prior Publication Data
US 2018/0292549 A1    Oct. 11, 2018

Related U.S. Application Data

(63) Continuation of application No. PCT/CN2016/107715, filed on Nov. 29, 2016.

(30) Foreign Application Priority Data

Dec. 11, 2015    (CN) .......................... 2015 1 0922008

(51) Int. Cl.
*G01T 7/00*     (2006.01)
*G01T 1/208*    (2006.01)
(Continued)

(52) U.S. Cl.
CPC ................ *G01T 7/00* (2013.01); *G01T 1/208* (2013.01); *G01T 1/2018* (2013.01); *G01T 1/248* (2013.01)

(58) Field of Classification Search
CPC ......... G01T 7/00; G01T 1/208; G01T 1/2018; G01T 1/248; G01T 7/005
See application file for complete search history.

(56) References Cited

U.S. PATENT DOCUMENTS

2003/0156684 A1*  8/2003  Fessler .................. A61B 6/482
                                                            378/210
2013/0327932 A1*  12/2013 Kim ....................... A61B 6/03
                                                            250/252.1
(Continued)

FOREIGN PATENT DOCUMENTS

CN         102797546 A     11/2012
CN         103777226 A      5/2014
(Continued)

OTHER PUBLICATIONS

International Search Report and Written Opinion for International Application No. PCT/CN2016/107715 dated Mar. 1, 2017.
(Continued)

*Primary Examiner* — Mohammad K Islam
(74) *Attorney, Agent, or Firm* — Wolf, Greenfield & Sacks, P.C.

(57)    ABSTRACT

An apparatus, device and method for measuring a gain of a sensor are disclosed. The apparatus comprises a current detection circuit (122) and a processing circuit (124). An input end of the current detection circuit (122) is used for connecting to an output end of a sensor unit (110). The current detection circuit (122) is used for detecting a current signal output by the sensor unit and generating a corresponding detection signal. An input end of the processing circuit (124) is connected to an output end of the current detection circuit (122). The processing circuit (124) is used for calculating energy of dark events occurring in the sensor unit (110) according to the detection signal, generating an energy spectrogram of the dark event, and calculating a gain of the sensor unit (110) based on the energy spectrogram.

19 Claims, 7 Drawing Sheets

(51) Int. Cl.
*G01T 1/20* (2006.01)
*G01T 1/24* (2006.01)

(56) References Cited

U.S. PATENT DOCUMENTS

| | | | | |
|---|---|---|---|---|
| 2014/0110573 | A1* | 4/2014 | Wang | G01T 1/40 |
| | | | | 250/252.1 |
| 2015/0177394 | A1* | 6/2015 | Dolinsky | G01T 7/005 |
| | | | | 250/252.1 |
| 2017/0018099 | A1* | 1/2017 | Heukensfeldt Jansen | |
| | | | | G06T 11/005 |
| 2017/0160129 | A1* | 6/2017 | Viswanath | G01J 1/46 |
| 2018/0066986 | A1* | 3/2018 | Kasai | G01J 1/42 |

FOREIGN PATENT DOCUMENTS

| | | |
|---|---|---|
| CN | 105074500 A | 11/2015 |
| CN | 105572721 A | 5/2016 |
| KR | 101450806 B1 | 10/2014 |

OTHER PUBLICATIONS

International Preliminary Report on Patentability for International Application No. PCT/CN2016/107715 dated Jun. 21, 2018.

* cited by examiner

APPARATUS, DEVICE AND METHOD FOR MEASURING GAIN OF SENSOR

RELATED APPLICATIONS

This Application is a Continuation of International Patent Application Serial No. PCT/CN2016/107715, filed on Nov. 29, 2016, entitled "APPARATUS, DEVICE AND METHOD FOR MEASURING GAIN OF SENSOR," which claims foreign priority benefits under 35 U.S.C. § 119(a)-(d) or 35 U.S.C. § 365(b) of Chinese Application No. 201510922008.8, filed on Dec. 11, 2015. Both of these applications are incorporated herein by reference in their entireties.

FIELD OF THE ART

The present invention relates to the field of circuits, and in particular, to an apparatus, device and method for measuring a gain of the sensor.

BACKGROUND

In high-energy photon (X-ray, gamma photons, etc.) measurement systems, photoelectric sensors such as a silicon photomultiplier (SiPM) are often used. The SiPM is a silicon-based photoelectric sensor. The SiPM consists of small sensor cells each with a side length of about 10 to 100 microns. Each sensor cell is an avalanche photodiode operating in a Geiger mode. Each sensor cell can only detect one visible photon every time. Hundreds of sensor cells form sensor units. The sensor unit generally has a size of 1 square millimeter to dozens of square millimeters. Hundreds of sensor units are combined together to form a larger sensor array (for example, an array composed of 16×16 3 mm×3 mm sensor units). The SiPM array and a scintillation crystal array are coupled together via a photoconductive layer to form a SiPM-based front-end detector. The SiPM-based front-end detector is widely applied to the detection for high-energy photons. Compared to conventional photomultipliers (PMTs), the SiPM has the advantages of small size, low bias voltage, high time resolution, compatibility with a magnetic resonance imaging (MRI) magnetic field, and the like. The SiPM has a disadvantage that its gain is greatly affected by a temperature. The change in the gain of the SiPM has a great influence on many performances of the SiPM-based front-end detector and can affect the measurement results for high-energy photons. In order to compensate for the influence of the change in the gain of the SiPM, the gain of the SiPM can be measured first to know a current change in the gain of the SiPM.

Therefore, it is desirable to provide an apparatus for measuring a gain of a sensor to at least partially solve the above problems existing in the prior art.

SUMMARY

In order to at least partially solve the problems existing in the prior art, according to an aspect of the present invention, there is provided an apparatus for measuring a gain of a sensor. The apparatus comprises a current detection circuit and a processing circuit. An input end of the current detection circuit is used for connecting to an output end of a sensor unit. The current detection circuit is used for detecting a current signal output by the sensor unit and generating a corresponding detection signal. An input end of the processing circuit is connected to an output end of the current detection circuit. The processing circuit is used for calculating energy of dark events occurring in the sensor unit according to the detection signal, generating an energy spectrogram of the dark events, and calculating a gain of the sensor unit based on the energy spectrogram.

According to another aspect of the present invention, there is provided a device for measuring gains of sensors. The device comprises a plurality of apparatuses for measuring the gain of the sensor as described above, which are in one-to-one correspondence with a plurality of sensor units in a sensor array.

According to yet another aspect of the present invention, there is provided a method for measuring a gain of a sensor. The method comprises the following steps: detecting a current signal output by a sensor unit and generating a corresponding detection signal; calculating energy of dark events occurring in the sensor unit according to the detection signal; generating an energy spectrogram of the dark events; and calculating a gain of the sensor unit based on the energy spectrogram.

According to the apparatus, device and method for measuring the gain of the sensor provided by the present invention, the gain of the sensor unit is determined according to the energy of the dark events in the sensor unit. Since the dark event rate in the sensor unit is high, a large amount of reference data may be obtained in a shorter period of time, such that the gain of the sensor unit may be determined quickly, accurately, and efficiently, which is advantageous for subsequent compensation for the change in the gain of the sensor unit.

A series of simplified concepts are introduced in the summary of the present invention and will be further described in detail in the detailed description. The summary of the present invention is not intended to attempt to limit the key features and the necessary technical features of the claimed technical solution, nor to attempt to limit the protection scope of the claimed technical solution.

The advantages and features of the present invention will be described in detail below with reference to the accompanying drawings.

BRIEF DESCRIPTION OF THE DRAWINGS

The following drawings of the present invention are incorporated herein as a part of the present invention for understanding the present invention. The drawings illustrate the embodiments of the present invention and their description to explain the principle of the present invention. In the drawings.

DETAILED DESCRIPTION

In the following description, lots of details are provided in order to thoroughly understand the present invention. However, those skilled in the art may understand that the following description only involves the preferred embodiments of the present invention, and they may be implemented without one or more of these details. In addition, some technical features that are well known in the art are not described in order to avoid confusion with the present invention.

Figure 1:
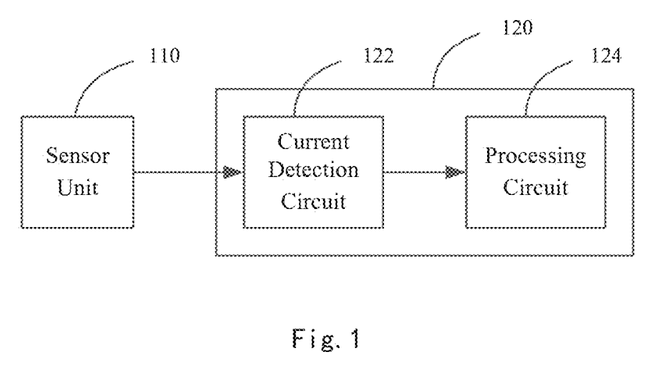
FIG. 1 illustrates a schematic block diagram of a sensor unit and an apparatus for measuring a gain of the sensor according to an embodiment of the present invention.

According to an aspect of the present invention, an apparatus for measuring a gain of a sensor is provided. FIG. 1 illustrates a schematic block diagram of a sensor unit 110 and an apparatus 120 for measuring a gain of the sensor according to an embodiment of the present invention. As shown in FIG. 1, the apparatus 120 comprises a current detection circuit 122 and a processing circuit 124.

An input end of the current detection circuit 122 is connected to an output end of the sensor unit 110. The current detection circuit 122 is used for detecting a current signal output by the sensor unit 110 and generating a corresponding detection signal.

The current detection circuit 122 may be any suitable circuit capable of detecting a current signal output by the sensor unit 110. For example, the current detection circuit 122 may include an oscilloscope for detecting the current signal and performing some desired processing on the current signal. It may be understood that the current detection circuit 122 detects the current signal output by the sensor unit 110 within a gain measurement period. During this gain measurement period, either an effective event(s) or a dark event(s) may occur, or no any event may occur. In a period in which no event occurs, the current signal output by the sensor unit is 0, and the detection signal generated by the current detection circuit 122 is also 0.

In this text, an effective event refers to an event in which a current signal is generated in a sensor unit, which is caused by high-energy photons (e.g., gamma photons, etc.) act in a scintillation crystal connected to the sensor unit. A dark event refers to an event in which a current signal is generated in the sensor unit, which is caused by noise (generally hot electrons). The sensor unit 110 may output a pulse current signal when an effective event or a dark event occurs. For convenience of description, in this text, a pulse current signal output by the sensor unit 110 when the effective event occurs is referred to as an effective current signal, and a pulse current signal output by the sensor unit 110 when the dark event occurs is referred to as a dark current signal. Energy of the effective current signal is much higher than energy of the dark current signal. The former is typically dozens to thousands of times higher than the latter. Therefore, whether an effective event or a dark event occurs in the sensor unit 110 may be determined by analyzing the energy of the current signal output by the sensor unit 110.

An input end of the processing circuit 124 is connected to an output end of the current detection circuit 122. The processing circuit 124 is used for calculating energy of dark events occurring in the sensor unit according to the detection signal, generating an energy spectrogram of the dark events, and calculating a gain of the sensor unit based on the energy spectrogram.

A gain (or a gain and a crosstalk rate) of a photoelectric sensor (especially a SiPM) is related to a temperature and a bias voltage applied to the photoelectric sensor. When the photoelectric sensor operates normally, the bias voltage is generally constant, so the gain (or the gain and the crosstalk ratio) thereof is mainly affected by the temperature. Taking the SiPM as an example, when the temperature rises, the gain (or the gain and the crosstalk ratio) of the SiPM decreases, and the number of dark events (the magnitude of the dark current) occurring per unit time increases. The change in the gain of the SiPM may be determined directly by detecting energy of a single dark event. In an example, energy of a standard dark event may be preset empirically or theoretically in advance. For example, the average energy of a dark event occurring in a SiPM applied a bias voltage of 30 V at a temperature of 25° C. may be set as the energy of the standard dark event, and the gain in this case may be set as a standard gain. The processing circuit 124 may acquire the change in energy of a dark event occurring within the gain measurement period relative to the energy of the standard dark event by analyzing an energy spectrogram of the dark events, so as to acquire the change in a gain of a SiPM within the gain measurement period relative to the standard gain. Then, a suitable compensation strategy may be developed on the basis of the change in the gain to compensate for the influences from the change in the gain.

According to the apparatus for measuring the gain of the sensor provided by the embodiment, the gain of the sensor unit is determined according to the energy of the dark events in the sensor unit. Since the dark event rate in the sensor unit is high, a large amount of reference data may be obtained in a shorter period of time, such that the gain of the sensor unit may be determined quickly, accurately, and efficiently, which is advantageous for subsequent compensation for the change in the gain of the sensor unit.

Figure 2:
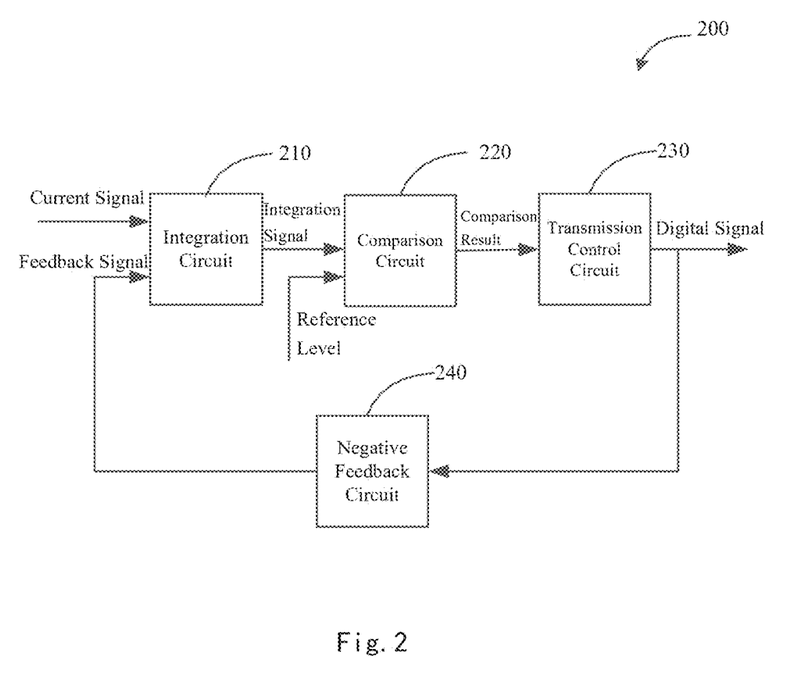
FIG. 2 illustrates a schematic block diagram of a current detection circuit according to an embodiment of the present invention.

Optionally, the detection signal is a digital signal which consists of high and low levels which are equal in duration. The sum of all high levels in the digital signal is directly proportional to the integration of the current signal over time. In an example, the current detection circuit may be implemented in a form shown in FIG. 2 to generate the above-mentioned digital signal. FIG. 2 illustrates a schematic block diagram of a current detection circuit 200 according to an embodiment of the present invention.

The current detection circuit 200 may comprise an integration circuit 210, a comparison circuit 220, a transmission control circuit 230, and a negative feedback circuit 240.

The integration circuit 210 is connected to an output end of a sensor unit (e.g. the sensor unit 110 shown in FIG. 1) and an output end of the negative feedback circuit 240. The integration circuit 210 is used for receiving a current signal from the sensor unit and a feedback signal from the negative feedback circuit 240, integrating a difference between the current signal and the feedback signal and outputting an integration signal.

The current detection circuit 200 is a circuit including a negative feedback loop. The feedback signal is input to the integration circuit 210. At the same time, the integration circuit 210 also receives the current signal from the sensor unit. The current signal and the feedback signal flow in opposite directions. For example, if the current signal flows from the integration circuit 210 to the sensor unit, the feedback signal may be set to flow from the negative feedback circuit 240 to the integration circuit 210. Therefore, for the integration circuit 210, the difference between the current signal and the feedback signal is actually input at last, and the integration circuit 210 may integrate the difference therebetween. It should be noted that the direction of an arrow shown in FIG. 2 is a transmission direction of a signal, but not necessarily a flow direction of the signal. The integration circuit 210 may be implemented by an analog integration circuit, such as a filter circuit composed of a resistor and a capacitor.

As shown in FIG. 2, one input end of the comparison circuit 220 is connected to an output end of the integration circuit 210, and the other input end of the comparison circuit 220 is connected to a reference level. The comparison circuit 220 is used for comparing the integration signal with the reference level to generate a comparison result. For example, the comparison circuit 220 may output a high level when the amplitude of the integration signal is larger than the reference level, and may output a low level when the amplitude of the integration signal is equal to or less than the reference level. Therefore, only two states, i.e., the high level and the low level may exist in the comparison result output by the comparison circuit 220. Generally, the current signal output by the sensor unit is a pulse current signal that changes with time. In this case, the integration signal is also a time-dependent signal. Therefore, the comparison result output by the comparison circuit 220 is a signal that is switched between the high level and the low level with time.

An input end of the transmission control circuit 230 is connected to an output end of the comparison circuit 220. The transmission control circuit 230 is used for controlling the transmission of the comparison result using a clock signal so as to output a digital signal. As described above, the comparison result is a signal which is switched between the high level and the low level with time. In this comparison result, the durations of the high level and the low level may change in real time and may be too difficult to be determined. Therefore, the comparison result may be quantized based on time by the transmission control circuit 230, such that the duration of each section of consecutive high level or low level is of an integral multiple of a period of a clock signal. This quantization based on time is equivalent to time discretization in an analog-to-digital conversion process. Therefore, the whole of the comparison circuit 220 and the transmission control circuit 230 may be regarded as a 1-bit ADC from a functional perspective. In the digital signal output by the transmission control circuit 230, the durations of each high level and each low level are the same and equal to the period of the clock signal respectively. In an example, the high level may represent the logic level "1", and the low level may represent the logic level "0". Then the digital signal is a sequence of the logic levels "1" and "0". It is assumed that the frequency of the clock signal is 100 Hz, i.e., the period thereof is 0.01 s, the duration of single "1" or "0" in the digital signal is 0.01 s. In addition, it may be understood that when a plurality of "1" or a plurality of "0" appear continuously, the duration of the plurality of "1" or the plurality of "0" is of an integral multiple of 0.01 s. The transmission control circuit 230 may be a register, a switching circuit controlled by the clock signal, or the like.

An input end of the negative feedback circuit 240 is connected to an output end of the transmission control circuit 230. The negative feedback circuit 240 is used for converting the digital signal into a feedback signal and feeding the feedback signal back to the integration circuit 210. The negative feedback circuit 240 may comprise a digital-to-analog converter (DAC) which is used for performing digital-to-analog conversion on the digital signal, to convert it to an analog signal. Specifically, the DAC may be a 1-bit DAC to convert the sequence consisting of "1" and "0" output from the transmission control circuit 230 to an analog signal, for example, to a voltage signal whose amplitude changes with time. The negative feedback circuit 240 may further comprise a resistor. The DAC is connected to an input end of the integration circuit 210 via this resistor. Therefore, a current signal flowing through the resistor, i.e., the feedback signal, is generated based on the voltage signal. The feedback signal may offset a part of the current signal from the sensor unit, so as to prevent the amplitude of the integration signal output by the integration circuit 210 from being too large, to keep the circuit stable. In addition, since the feedback signal continuously offsets the current signal from the sensor unit, an accumulated value of the feedback signal induced by the current signal may be regarded as an accumulated value of the current signal from the sensor unit. At the same time, the amplitude of the feedback signal is directly proportional to the amplitude of the digital signal. Therefore, when the duration of the current signal has ended and the amplitude of the feedback signal has been stabilized at zero (i.e., the negative feedback action for the current signal has ceased), energy of photons may be calculated by using the digital signal. It should be noted that the amplitude of the feedback signal should not be too large or too small. If the amplitude of the feedback signal is too large, the offset speed for the current signal is too fast, such that the error contained in the digital signal increases, which affects the measurement accuracy. On the contrary, if the amplitude of the feedback signal is too small, the offset speed for the current signal is too slow, such that the size of the integration signal may not be reduced in time, which also affects the measurement accuracy. The amplitude of the feedback signal may be determined according to actual needs, and will not be limited in the present invention.

Figure 3:
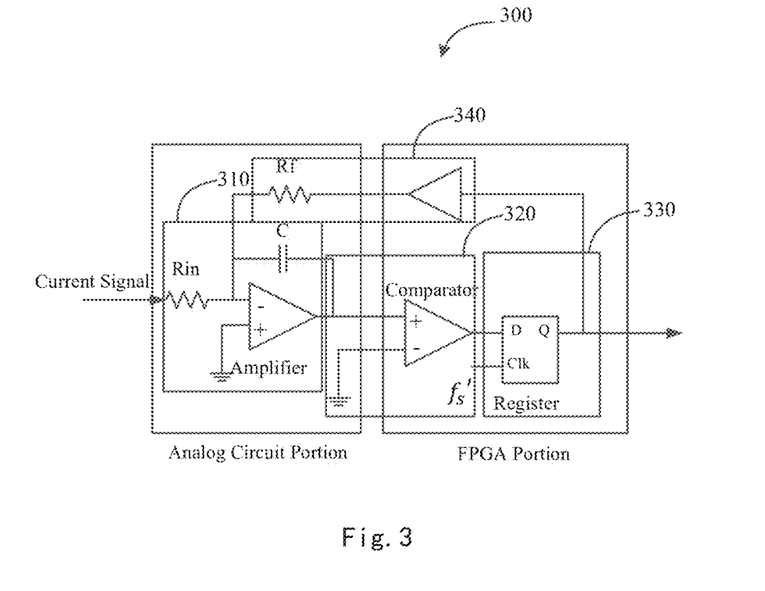
FIG. 3 illustrates a schematic circuit diagram of a current detection circuit according to an embodiment of the present invention.

FIG. 3 illustrates a schematic circuit diagram of a current detection circuit 300 according to an embodiment of the present invention. The circuit detection circuit 300 may comprise an integration circuit 310, a comparison circuit 320, a transmission control circuit 330 and a negative feedback circuit 340.

The integration circuit 310 may be implemented by use of an operational amplifier, a resistor Rin and a capacitor C. The comparison circuit 320 may be implemented by use of a comparator. A reference level of the comparison circuit 320 is the ground level. The transmission control circuit 330 may be implemented by use of a register formed by a D flip-flop. The clock signal of the transmission control circuit 330 has a frequency of $f_s'$. The negative feedback circuit 340 may be implemented by use of a DAC and a resistor Rf. The DAC may be a pin of a field programmable gate array (FPGA). As shown in FIG. 3, the whole current detection circuit 300 may be implemented by an analog circuit portion and an FPGA portion. As required, a diode or a voltage division circuit may also be added into the circuit to block or reduce a bias direct current that may exist in the circuit. Those skilled in the art may understand the principle and the operation way of the current detection circuit 300 according to the above description of the current detection circuit 200, which will not be described here again.

A digitized detection signal is generated to facilitate the subsequent calculation for the energy of the effective event or the dark event.

Optionally, the processing circuit 124 may calculate the energy of the dark events occurring in the sensor unit 110 in the following manner: determining whether a pulse event occurs according to an appearance rule of the high levels and the low levels in the digital signal; using the digital signal to calculate energy of the pulse event when it is determined that the pulse event occurs, till it is determined that the pulse event is ended according to the appearance rule of the high levels and the low levels in the digital signal; and judging whether the pulse event is an effective event or a dark event according to the energy of the pulse event, and determining the energy of the pulse event as the energy of the dark event if the pulse event is the dark event.

The pulse event refers to an event in which a pulse current signal is generated in a sensor unit, which may be an effective event or a dark event. As described above, a digital signal is a sequence of "0" and "1". When no effective event or dark event occurs in the sensor unit, the current detection circuit 122, 200, or 300 outputs a series of consecutive "0", and when an effective event or a dark event occurs, a signal output by the current detection circuit 122, 200 or 300 should include a plurality of "1". The appearance rule of "1" and "0" when a pulse event occurs and no pulse event occurs may be summarized, such that two cases in which the pulse event occurs and no pulse event occurs may be distinguished according to the summarized rule. For example, if there is a "1" after many (for example, 10) consecutive "0" in the digital signal, it is indicated that a pulse event has occurred at this time, and the pulse event may be an effective event or a dark event. Subsequently, energy of the pulse event may be calculated by use of "1" in the digital signal. For example, "1" in the digital signal may be accumulated or counted. It is indicated that the pulse event ends by the appearance of five consecutive "0" has appeared in the digital signal, and the accumulation or counting of the "1" may be stopped. In this way, the relative energy of the pulse event, which may reflect the absolute energy of the pulse event, may finally be obtained. As mentioned above, the energy of the effective event is very different from the energy of the dark event, such that the effective event and the dark event may be distinguished by energy. For example, if the finally obtained relative energy of the pulse event is several thousands, the pulse event may be considered as an effective event, and the calculated energy may be discarded at this moment. If the finally obtained relative energy of the pulse event is several hundreds, the pulse event may be considered as a dark event, and the calculated energy may be considered as the energy of the dark event and used to generate an energy spectrogram. This manner of measuring the energy of the dark event may be considered as a triggering manner, i.e., the energy of the dark event is measured when the dark event is triggered.

Optionally, the horizontal axis of the energy spectrogram represents energy of a dark event(s), and the vertical axis of the energy spectrogram represents the times the energy of the dark event(s) is obtained by calculating. The processing circuit 124 may calculate the gain of the sensor unit 110 in the following manner: calculating the gain according to a horizontal coordinate of a first spectrum peak corresponding to energy of a single dark event in the energy spectrogram, or calculating the gain according to a difference between the horizontal coordinate of the first spectrum peak and a horizontal coordinate of a second spectrum peak corresponding to energy of two dark events in the energy spectrogram.

Figure 4:
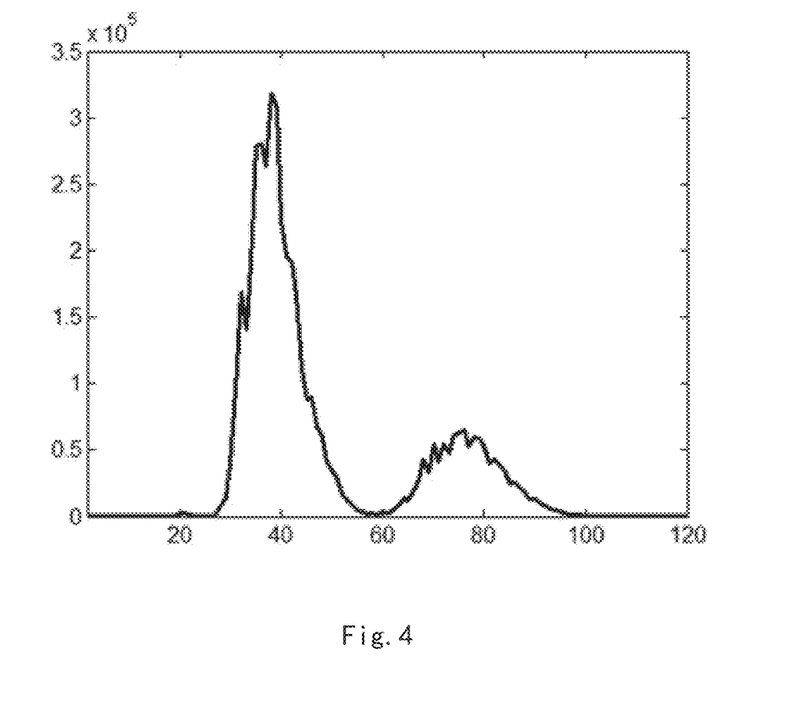
FIG. 4 illustrates an energy spectrogram of dark events according to an embodiment of the present invention.

According to the method described above, a relative energy value of a dark event may be calculated every time the dark event occurs. The dark event detection and energy calculation may be continuously performed within a measurement period (e.g., 5 seconds). Spectrum analysis may be performed for all the dark events detected within the measurement period to obtain an energy spectrogram. FIG. 4 illustrates an energy spectrogram of dark events according to an embodiment of the present invention. The energy spectrogram shown in FIG. 4 has two more distinct spectrum peaks, the left one being an energy spectrum peak (i.e., a first spectrum peak) of common dark events, and the right one being an energy spectrum peak (i.e., a second spectrum peak) of dark events having cross talk. The horizontal coordinate of the second spectrum peak is almost twice that of the first spectrum peak. Specifically, the first spectrum peak is at a position where the energy is about 40 which represents energy of a single dark event, and therefore, the first spectrum peak corresponds to the energy of the single dark event. The second spectrum peak is at a position where the energy is about 80 which represents energy of two dark events, and therefore, the second spectrum peak corresponds to the energy of the two dark events. As can be seen from the above description, the processing circuit 124 calculates the energy of the dark event(s) based on the digital signal within a period from the start of dark events to the end of the dark events, such that what is obtained each time is basically energy of a single dark event.

A gain of energy of a dark event represents a gain of a sensor unit. The energy of the current single dark event may be acquired according to a horizontal coordinate of the first spectrum peak or a difference between the horizontal coordinate of the first spectrum peak and a horizontal coordinate of the second spectrum peak. The gain may be calculated according to a difference between the energy of the current single dark event and the energy of the standard dark event. For example, it is assumed that the energy of the standard dark event is 30 and the standard gain is 100. According to the spectrogram shown in FIG. 4, it is known that the energy of the current single dark event is close to 40. In this case, the current gain of the sensor unit may be considered to be approximately 1.33 times as big as the standard gain, i.e. the current gain is 133. It may be understood that the positions of the first spectrum peak and the second spectrum peak may be inaccurate, for example, may move to the left or right, due to factors such as interference. However, since the first spectrum peak and the second spectrum peak move synchronously, the difference between the horizontal coordinates of the first spectrum peak and the second spectrum peak is always constant. Therefore, the manner of calculating the gain using the difference between the horizontal coordinate of the first spectrum peak and the horizontal coordinate of the second spectrum peak has higher accuracy than the manner of calculating the gain by directly using the horizontal coordinate of the first spectrum peak.

Optionally, the processing circuit 124 may calculate the energy of the dark events occurring in the sensor unit 110 in the following manner: determining a period(s) in which no effective event occurs according to the appearance rule of the high levels and the low levels in the digital signal; selecting digital signals generated within predetermined periods from a digital signal(s) generated within the period (s) in which no effective event occurs; and calculating the energy of the dark events according to the digital signals generated within the predetermined periods.

A period in which an effective event occurs may be determined first according to the appearance rule of "1" and "0" in the digital signal, and then a period in which no effective event occurs may be determined. For example, if there are 5,000 "1" in a digital signal, it may be considered that an effective event occurs. If there are 4000 "1" in another digital signal adjacent to the digital signal, it may also be considered that an effective event occurs. A plurality of dark events may occur between the two effective events. Therefore, it is possible to select one or more predetermined periods between the two effective events, and select a digital signal(s) generated within the predetermined period(s). The predetermined period may be any suitable period, such as 10 microseconds, which will not be limited in the present invention. For example, if the entire period between the two effective events has a length of 1 millisecond, the 1 millisecond may be divided into 100 10 microseconds. Energy of dark events contained within each 10 microseconds is calculated respectively to obtain 100 energy values of the dark events. Such effective event detection and dark event energy calculation may be continuously performed within the gain measurement period (e.g., 5 seconds). In this case, instead of using the triggering manner to start the energy measurement of the dark events, energy of all dark events within a predetermined period(s) in which no effective event (dark event only) has occurred is calculated for generating the energy spectrogram.

Optionally, the predetermined period(s) may be set such that an average number of dark events within the predetermined period(s) meets a first preset condition. The horizontal axis of the energy spectrogram represents energy of a dark event(s), and the vertical axis of the energy spectrogram represents the times the energy of the dark event(s) is obtained by calculating. The energy spectrogram includes a plurality of spectrum peaks, and the N-th spectrum peak in the energy spectrogram is corresponding to energy of N dark events. The processing circuit 124 may calculate the gain of the sensor unit in the following manner: calculating the gain according to a difference between horizontal coordinates of any two adjacent spectrum peaks in the energy spectrogram. Optionally, the first preset condition is that the average number of dark events is less than 20. When the average number of the dark events is less than 20, there is a plurality of discrete spectrum peaks in the energy spectrogram, that is, the energy spectrogram exhibits a Poisson distribution curve. Of course, it may be understood that, the average number of the dark events that causes the energy spectrogram to exhibit the Poisson distribution curve may also have other suitable range of values, which will not be limited in the present invention and will be described in detail as below.

Figure 5:
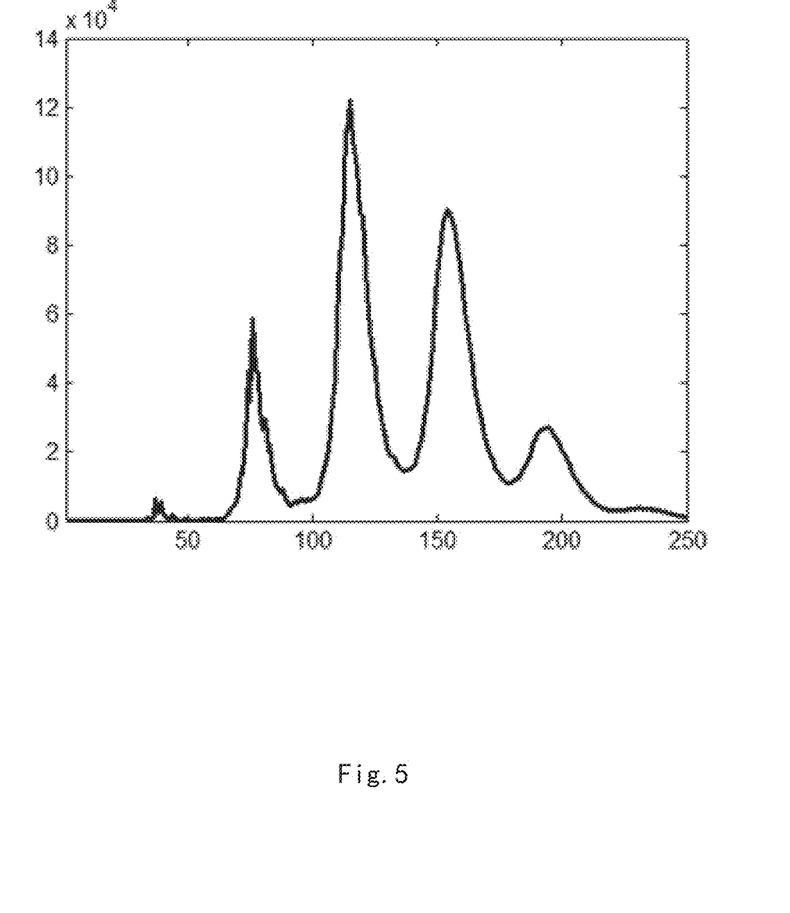
FIG. 5 illustrates an energy spectrogram of dark events according to another embodiment of the present invention.

As can be seen from the above description, the processing circuit 124 may always calculates energy of the dark events based on the predetermined period(s). If the predetermined period(s) is set properly, it is possible to cause a plurality of dark events to occur within each predetermined period, such that the energy of dark events calculated each time is equal to the sum of energy of the plurality of dark events. FIG. 5 illustrates an energy spectrogram of dark events according to another embodiment of the present invention. As shown in FIG. 5, the energy spectrogram has more spectrum peaks than FIG. 4, and the highest spectrum peak is no longer the first spectrum peak. This is because the period is set longer such that the possibility of a plurality of dark events occurring within each period is much higher than the possibility of a single dark event occurring only, such that energy of the dark events calculated each time is always greater than energy of a single dark event. The average number of dark events refers to a result of the number of dark events occurring within all selected predetermined periods (within the gain measurement period) divided by the number of predetermined periods.

The energy spectrogram shown in FIG. 5 includes the following spectrum peaks. A horizontal coordinate of a first spectrum peak represents energy of one dark event (occurring in a predetermined period). A horizontal coordinate of a second spectrum peak represents energy of two dark events (occurring the predetermined period). In the similar way, a horizontal coordinate of an N-th spectrum peak represents energy of N dark events (occurring in the predetermined period). The horizontal coordinate of the N-th spectrum peak is basically N times as big as that of the first spectrum peak. The gain of energy of a dark event is the gain of the sensor unit. When a gain changes with temperature, all the spectrum peaks shown in FIG. 5 may move to the right. By tracking the change in the positional of one (or several) of the spectrum peaks, the change in the gain of the sensor unit may be acquired. This gain measurement method has the following advantages. Since the horizontal coordinate of the N-th spectrum peak is N times as big as the horizontal coordinate of the first spectrum peak, the movement of the horizontal coordinate of the N-th spectrum peak caused by the change in temperature is N times as far as the movement of the horizontal coordinate of the first spectrum peak. Therefore, the calculation of the change in the gain caused by the change in temperature by calculating the movement of the horizontal coordinate of the N-th spectrum peak has higher sensitivity and accuracy than by calculating the movement of the horizontal coordinate of the first spectrum peak. In addition, since the first spectrum peak is less distinct, the gain may also be calculated according to the difference between the horizontal coordinates of any two adjacent spectrum peaks. This manner is similar to the manner of calculating the gain according to the difference between the horizontal coordinate of the first spectrum peak and the horizontal coordinate of the second spectrum peak described above, and will not be described again.

Optionally, the predetermined period(s) is set such that the average number of dark events within the predetermined period(s) meets a second preset condition. The horizontal axis of the energy spectrogram represents the energy of a dark event(s), and the vertical axis of the energy spectrogram represents the times the energy of the dark event(s) is obtained by calculating. The processing circuit 124 may calculate the gain of the sensor unit in the following manner: performing Gaussian fitting on the energy spectrogram to obtain a variance and a mean of the energy spectrogram; and dividing the variance by the mean to obtain the gain. Optionally, the second preset condition may be that the average number of dark events is greater than 20. When the average number of the dark events is greater than 20, the energy spectrogram may approximately exhibit a Gaussian distribution curve. Of course, it may be understood that, the average number of the dark events that causes the energy spectrogram to exhibit the Gaussian distribution curve may also have other suitable range of values, which will not be limited in the present invention and will be described in detail as below.

Figure 6:
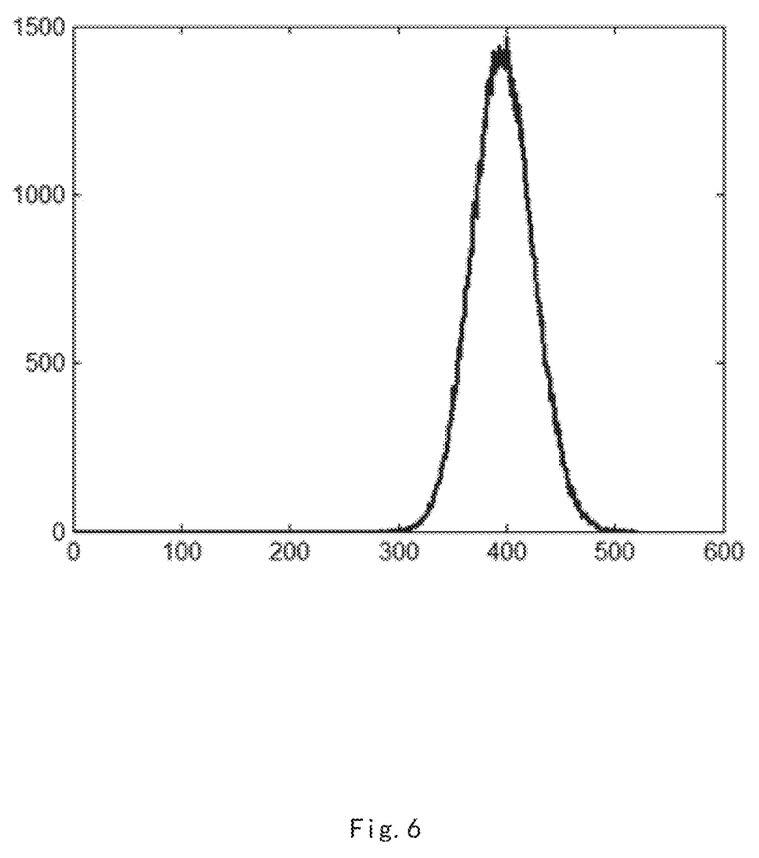
FIG. 6 illustrates an energy spectrum of dark events according to yet another embodiment of the present invention.

FIG. 6 illustrates an energy spectrum of dark events according to another embodiment of the present invention. Differing from the embodiment shown in FIG. 5, an energy accumulation time (i.e., the so-called predetermined period) of the embodiment shown in FIG. 6 is much longer than that of the embodiment shown in FIG. 5, such that no discrete spectrum peaks appears in the resulting energy spectrogram.

The whole energy spectrogram exhibits an approximate normal distribution (i.e., a Gaussian distribution) curve as shown in FIG. 6.

The basic principles of this phenomenon are as follows:

(1) the number of dark events within a predetermined period obeys essentially a discrete Poisson distribution;

(2) when fewer dark events occur within a predetermined period, discrete spectrum peaks may appear. But due to measurement errors, the spectrum peaks in the actual energy spectrogram may have a certain width;

(3) when more dark events occur within a predetermined period, the Poisson distribution gradually approaches the normal distribution. If the average number $\lambda$ of the dark events within predetermined period(s) is greater than a certain value (for example, 20), the Poisson distribution may be considered as the normal distribution $N(\lambda, \lambda)$ and may be processed as the normal distribution; and (4) the horizontal axis of the energy spectrogram measured according to the present embodiment corresponds to $\lambda G$ (G is the gain of the sensor unit), rather than the average number $\lambda$ of the dark events within the predetermined period. Therefore, if the Poisson distribution exhibits the normal distribution of $N(\lambda, \lambda)$, the normal distribution which the energy spectrogram exhibits is $N(\lambda G, \lambda G^2)$. Therefore, the gain G of the sensor unit may be obtained by dividing a variance of this normal distribution by a mean thereof.

It should be noted that the calculated gain is actually a product of three items: the gain G, "1+crosstalk rate" and "1+single photon detection resolution squared". In actual conditions, a product of the "1+crosstalk rate" and the "1+single photon detection resolution squared" is very close to 1. Therefore, it is generally considered that the product of the gain G, the "1+crosstalk ratio" and the "1+single photon detection resolution squared" is approximately equal to the gain G. In addition, it should be noted that, the single photon detection resolution is generally about 0.05, and the "1+single photon detection resolution squared" is approximately equal to 1. Therefore, the calculated gain may also be approximately equal to the product of the gain G and the "1+crosstalk ratio". Since energy of an effective event measured by the SiPM is directly proportional to the product of the gain G and the "1+crosstalk ratio", the gain compensation is needed to simultaneously compensate for the influences of a temperature on the gain G and the "1+crosstalk ratio". Therefore, it is more practical to calculate the product of the gain G and the "1+crosstalk ratio" than to simply calculate the true gain.

Therefore, according to the present embodiment, the implementation of calculating the gain of the sensor unit is actually very simple and easy to implement, the basic steps are as follows:

(1) performing Gaussian fitting on the energy spectrogram to calculate a mean $\mu$ and a variance $\sigma^2$ of the energy spectrogram; and (2) calculating the gain G of the sensor unit according to the equal $G=\sigma^2/\mu$.

Figure 7A:
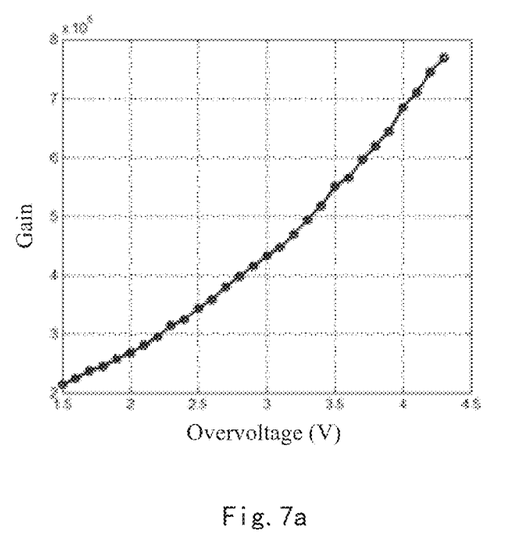
FIG. 7a illustrates a change curve of a gain of a specific type of SiPM measured according to the embodiment shown in FIG. 6 along with an overvoltage.
Figure 7B:
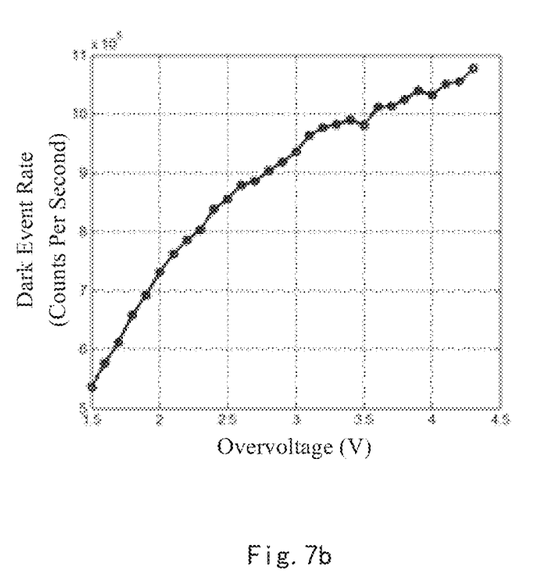
FIG. 7b illustrates a change curve of a dark event rate of a specific type of SiPM measured according to the embodiment shown in FIG. 6 along with an overvoltage.

FIG. 7a illustrates a change curve of a gain of a specific type of SiPM measured according to the embodiment shown in FIG. 6 along with an overvoltage. FIG. 7b illustrates a change curve of a dark event rate of the specific type of SiPM measured according to the embodiment shown in FIG. 6 along with an overvoltage (a dark event rate is approximately equal to a dark current divided by the gain). As can be seen from FIGS. 7a and 7b, the gain measurement result of the embodiment shown in FIG. 6 is more accurate.

In the embodiment shown in FIG. 5, a current detection circuit that detects a current (or charges) generated by dark events may be generally required to have higher accuracy. This is always at the expense of a dynamic range (or a dead time) of the whole current detection circuit. In the embodiment shown in FIG. 6, the accuracy of the current detection circuit is not required to be higher.

Optionally, the processing circuit 124 is further used for calculating energy $E_0$ of an effective event occurring in the sensor unit according to the detection signal, and correcting the energy $E_0$ of the effective event according to the following formula: $E=E_0*G_0/G$, in which, E is the corrected energy, G is the gain, and $G_0$ is a predetermined constant.

Although the method for measuring the energy of the effective event by use of the processing circuit 124 and the current detection circuit 122, 200, or 300 is described according to the present embodiment, it may be understood that any other suitable apparatus may also be used to measure the energy of the effective event.

In this text, the gain G of the sensor unit may be calculated in real time, which may change with time. $G_0$ may also be any suitable value, which is not limited herein.

For example, $G_0$ may be equal to, for example, the standard gain described above. By comparing the gain of the sensor unit measured at the current moment with the standard gain, the difference between the energy of the effective event measured at the current moment and the energy at the standard gain may be acquired, such that the energy measured at the current moment may be corrected as the energy at the standard gain. If all energy of a plurality of sensor units is corrected in this way, it is equivalent to making the energy of the plurality of sensor units be based on the same standard, such that their energy can be compared with each other. For example, if the standard gain is 100 and the gain G measured at the current moment is 200, it is indicated that the gain at the current moment is doubled. Therefore, the measured energy may also be twice as much as the energy at the standard gain. If the measured energy $E_0$ is 2000, the corrected energy E may be 1000.

In addition, the energy of the sensor unit may also be corrected to an actual energy. In this case, $G_0$ may be set to 1. It is assumed that, if it has been acquired according to the embodiment described herein that the current gain of the sensor unit is 1.5 and the current energy of a detected effective event is 3000, the energy 3000 may be divided by the gain 1.5 to obtain the corrected energy 2000 of the effective event.

It may be understood that the energy of the effective event or the dark event calculated by the processing circuit 124 may be relative energy instead of absolute energy, and thus the gain of the sensor unit may also be represented by a relative gain instead of an absolute gain.

For example, referring back to FIG. 4, as mentioned above, it is assumed that the energy of the standard dark event is 30 and the standard gain is 100. It is assumed that the energy spectrogram obtained within a gain measurement period (represented by a "first gain measurement period" for convenience of description) is as shown in FIG. 4. Energy of a single dark event within the first gain measurement period is close to 40. In this way, the absolute gain of the sensor unit within the first gain measurement period may be considered to be approximately 1.33 times as big as the standard gain, i.e., the absolute gain within the first gain measurement period is 133. In a preset time range before or after the first gain measurement period, it may be considered that the gain is same as that in the first gain measurement period. In this time range, if the energy of the detected effective event is 10000, the energy 10000 may be divided by the absolute gain 133 to obtain the corrected energy 75. Then, within another gain measurement period (represented by a "second gain measurement period" for convenience of description), if the energy spectrogram moves to the right, the calculated energy of a single dark event within the second gain measurement period is caused to be close to 50. The absolute gain of the sensor unit within the second gain measurement period may be considered as approximately 1.67 times as big as the standard gain, i.e., the absolute gain within the second gain measurement period is 167. In a preset time range before or after the second gain measurement period, it may be considered that the gain is same as that in the second gain measurement period. In this time range, if the energy of the detected effective event is 10000, the energy 10000 may be divided by the absolute gain 167 to obtain the corrected energy 60. In this way, the difference between the energy of the two effective events may be acquired by comparing the corrected energy 75 with the corrected energy 60.

Alternatively, it is also possible to directly consider 40 as the gain of the sensor unit within the first gain measurement period. That is, there is no need to calculate the absolute gain based on the standard dark event and the standard gain. In this case, the energy 10000 may be divided by the gain 40 to obtain the corrected energy of 250. Subsequently, 50 may also be directly considered as the gain of the sensor unit within the second gain measurement period. In this case, the energy 10000 may be divided by the gain 50 to obtain the corrected energy 200. The difference between the energy of the two effective events may be acquired by comparing the corrected energy 250 with the corrected energy 200. The results for 75/60 and 250/200 are the same, so it can be seen that whether the absolute gain or the relative gain is calculated, the relative values between energy of respective effective events may be correctly reflected. The above-mentioned two gain calculation methods may be considered to adopt two different normalization manners respectively, and may be selected as required. The finally obtained energy value can be more accurate as the energy of the effective event is corrected on the basis of the gain.

Optionally, the processing circuit 124 may be implemented with any suitable digital circuit, such as a field programmable gate array (FPGA), a complex programmable logic device (CPLD), a digital signal processor (DSP), a micro-control unit (MCU), a central processing unit (CPU), and so on.

The embodiments have the following advantages.

(1) The hardware cost is relatively low. The circuits provided by the embodiments of the present invention have simple structures. The current detection circuits may be implemented with analog circuits. The processing circuits may be implemented with digital circuits. No excessive hardware is needed by the whole circuit, so the cost is relatively low.

(2) There is no interference to normal operations of the sensor units. According to the embodiments, the gain of the sensor units may be calculated by detecting and analyzing the current (charges) generated by dark events, which is generally considered as noise, without any interference to normal operating states of the sensor units.

(3) The gain measurement and compensation can be performed with high precision in real time. The dark event rate in the sensor units is generally greater than 300 kHz. This makes it possible to collect enough data in a sufficiently short time to ensure the accuracy of the spectrum analysis, such that the change in the gain with a temperature can be measured and compensated more accurately in real time. The response speed is very fast.

Figure 8:
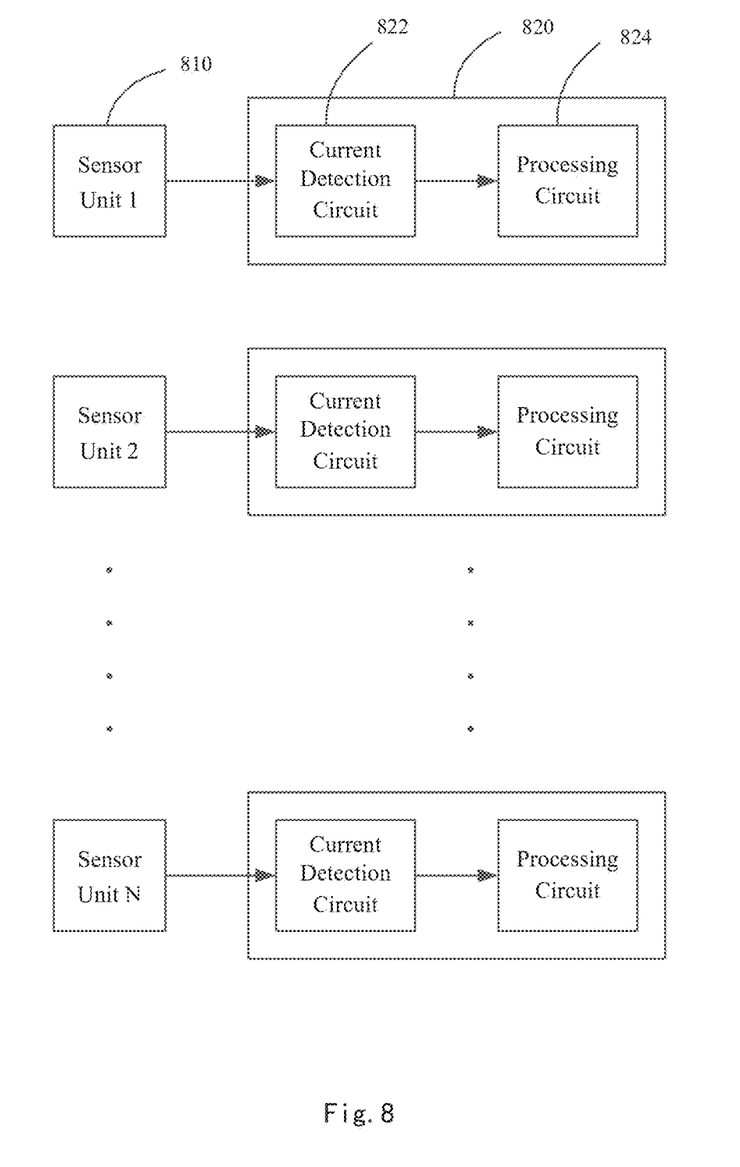
FIG. 8 illustrates a schematic block diagram of a sensor array and a device for measuring gains of sensors according to an embodiment of the present invention.

According to another aspect of the present invention, there is provided a device for measuring gains of sensors. The device comprises a plurality of apparatuses for measuring the gain of the sensor described above, which are in one-to-one correspondence with a plurality of sensor units in a sensor array. FIG. 8 illustrates a schematic block diagram of a sensor array and a device for measuring gains of sensors according to an embodiment of the present invention.

As shown in FIG. 8, the sensor array comprises N sensor units 810, namely a sensor unit 1, a sensor unit 2, . . . , and a sensor unit N. The device for measuring the gains of the sensors comprises N apparatuses 820 for measuring the gain of the sensor, which are in one-to-one correspondence with the N sensor units. Each apparatus 820, the same as the apparatus 120 described above, comprises a current detection circuit 822 and a processing circuit 824. Those skilled in the art can understand the structure, operation way and advantages of the device for measuring the gains of the sensors according to the above description of the apparatus for measuring the gain of the sensor and by reference to FIGS. 1 to 7b, which will not be repeated again.

It should be noted that, in the device for measuring the gains of the sensors, each processing circuit 824 may be implemented by use of the digital circuit such as the FPGA as described above. It may be understood that any number of processing circuits 824 in the device for measuring the gains of the sensors may be integrated in the same digital circuit such as the FPGA.

Optionally, the processing circuit 824 may be further used for calculating energy $E_0$ of an effective event occurring in a corresponding sensor unit according to a detection signal, and correcting the energy $E_0$ of the effective event according to the following formula: $E=E_0*G_0/G$, in which, E is the corrected energy, G is the gain of the corresponding sensor unit, and $G_0$ is a predetermined constant. Optionally, $G_0$ is a standard gain of the corresponding sensor unit of each processing circuit 824. For a sensor array, the standard gain of each sensor unit is generally the same.

The following description will be made by reference to the SiPM. The gain of a SiPM unit is generally directly proportional to a bias overvoltage thereof. The bias overvoltage is equal to a difference between a bias voltage and a breakdown voltage. Due to the microelectronic process, the breakdown voltages of different SiPM units have certain differences. When the same series of SiPM units form a SiPM array, the same bias (operating) voltage is generally used. Since the breakdown voltage of all SiPM units is slightly different, their gains are also different. The difference between the gains of the SiPM units in the SiPM array may affect the performance of a front-end detector composed of the SiPM array. Generally, the SiPM units that form the SiPM array need to be tested and screened. The SiPM units whose breakdown voltages are different slightly are selected to form the SiPM array. In this way, the production cost of the SiPM array is increased, and the gain between every two SiPM units in the SiPM array is also difficult to be completely consistent. Therefore, the gain of each SiPM unit in the SiPM array may be measured in real time, and the consistency of the gains of the SiPM units may be ensured by a gain compensation method.

The expression "$G_0/G$" in the formula $E=E_0*G_0/G$ realizes the normalization of the gains of the sensor units in the same sensor array, such that the consistency of the gains of the sensor units may be ensured. For example, the gains of three sensor units in the same sensor array may be 1, 1.5, and 0.8, respectively. Therefore, for effective events whose energy is the same, the energy detected by each sensor unit may be different. However, it is desirable that the energy detected by the three sensor units is the same. Therefore, when the energy is subsequently corrected (that is, the change in the gain is compensated), the constant $G_0$ is first divided by 1, 1.5, and 0.8, respectively, which is equivalent to performing gain normalization. $G_0$ may be determined as required. After energy correction, the influence of the difference between the gains of the sensor units on energy measurement has been eliminated for the whole sensor array.

Figure 9:
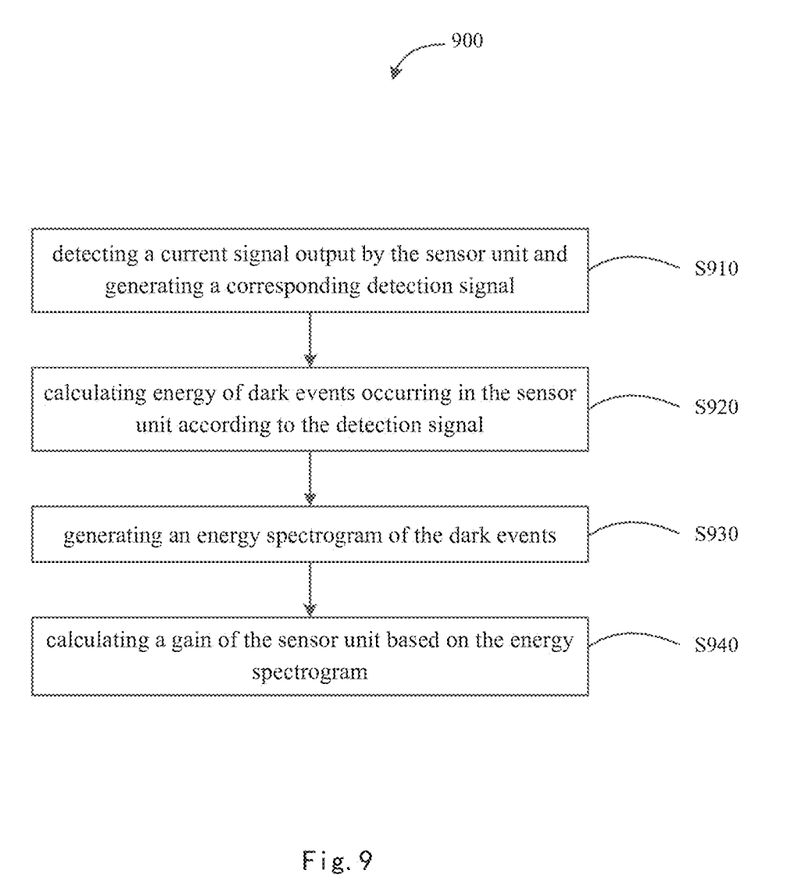
FIG. 9 illustrates a flowchart of a method for measuring a gain of a sensor according to an embodiment of the present invention.

According to another aspect of the present invention, there is provided a method for measuring a gain of a sensor. FIG. 9 illustrates a flowchart of a method 900 for measuring a gain of a sensor according to an embodiment of the present invention. As shown in FIG. 9, the method 900 comprises the following steps:

Step S910, detecting a current signal output by the sensor unit and generating a corresponding detection signal;

Step S920, calculating energy of dark events occurring in the sensor unit according to the detection signal;

Step S930, generating an energy spectrogram of the dark events; and

Step S940, calculating a gain of the sensor unit based on the energy spectrogram.

Optionally, the detection signal is a digital signal which consists of high and low levels which are equal in duration. A sum of all high levels in the digital signal is directly proportional to the integration of the current signal over time.

Optionally, the step S920 may include: determining whether a pulse event occurs according to an appearance rule of the high and low levels in the digital signal; using the digital signal to calculate energy of the pulse event when it is determined that the pulse event occurs, till it is determined that the pulse event is ended according to the appearance rule of the high and low levels in the digital signal; and judging whether the pulse event is an effective event or a dark event according to the energy of the pulse event, and determining the energy of the pulse event as energy of the dark event if the pulse event is the dark event.

Optionally, the horizontal axis of the energy spectrogram represents the energy of a dark event(s), and the vertical axis of the energy spectrogram represents the times the energy of the dark event(s) is obtained by calculating. The step S940 may include: calculating the gain according to a horizontal coordinate of a first spectrum peak corresponding to energy of a single dark event in the energy spectrogram, or calculating the gain according to a difference between the horizontal coordinate of the first spectrum peak and a horizontal coordinate of a second spectrum peak corresponding to energy of two dark events in the energy spectrogram.

Optionally, the step S920 may include: determining a period(s) in which no effective event occurs according to the appearance rule of the high and low levels in the digital signal; selecting a digital signal(s) generated within a predetermined period(s) from a digital signal(s) generated within the period(s) in which no effective event occurs; and calculating the energy of the dark events according to the digital signal(s) generated within the predetermined period(s).

Optionally, the predetermined period(s) is set such that an average number of dark events within the predetermined period(s) meets a first preset condition. The horizontal axis of the energy spectrogram represents energy of a dark event(s). The vertical axis of the energy spectrogram represents the times the energy of the dark event(s) is obtained by calculating. The energy spectrogram includes a plurality of spectrum peaks, and the N-th spectrum peak in the energy spectrogram is corresponding to energy of N dark events. The step S940 may include: calculating the gain according to a difference between horizontal coordinates of any two adjacent spectrum peaks in the energy spectrogram.

Optionally, the first preset condition is that the average number of dark events is less than 20.

Optionally, the predetermined period(s) is set such that an average number of dark events within the predetermined period(s) meets a second preset condition. The horizontal axis of the energy spectrogram represents energy of a dark event(s). The vertical axis of the energy spectrogram represents the times the energy of the dark event(s) is obtained by calculating. The step S940 may include: performing Gaussian fitting on the energy spectrogram to obtain a variance and a mean of the energy spectrogram; and dividing the variance by the mean to obtain the gain.

Optionally, the second preset condition is that the average number of dark events is greater than 20.

Optionally, the method 900 may further comprise: calculating energy $E_0$ of an effective event occurring in the sensor unit according to the detection signal; and correcting the energy $E_0$ of the effective event according to the following formula: $E=E_0*G_0/G$, in which, E is the corrected energy, G is the gain, and $G_0$ is a predetermined constant.

Those skilled in the art can understand the implement, the advantages and the like of the method 900 for measuring the gain of the sensor disclosed herein according to the above description of the apparatus for measuring the gain of the sensor and by reference to FIGS. 1 to 8, which will not be repeated here again for clarity.

The existing gain compensation methods for SiPM generally include: a temperature control method, a temperature compensation method and a spectrum peak tracking method.

(1) In the temperature control method, the temperature of the SiPM is directly stabilized by a temperature measurement and control system, thereby stabilizing a gain of the SiPM. This method requires a high-cost constant temperature system to be constructed. In many cases, this method is not feasible due to physical space limitations.

(2) In the temperature compensation method, a bias voltage is adjusted according to a change in a temperature to stabilize the gain of the SiPM. For example, as the temperature increases, the bias voltage may be increased to stabilize the gain. Ideally, this method requires a temperature measurement and voltage control circuit to be designed for each SiPM unit in the SiPM array. In practical applications, a group of SiPM units with close physical spaces may share a temperature measurement and voltage control circuit. This method is the most widely used but costly.

(3) In the spectrum peak tracking method, the gain is automatically calibrated by finding and tracking a photopeak position of an energy spectrum detected by the SiPM when an effective event occurs. The accuracy of this method depends on the speed of temperature drift and the effective event rate. To achieve accurate positioning of spectrum peaks at a certain temperature, more events are needed to overcome statistical errors. Under general circumstances (e.g., PET human imaging), the effective event rate is very low, and it is difficult to track photopeaks in real time.

Compared with the existing gain compensation method, the circuit provided by the embodiments of the present invention for measuring and compensating the gain of the sensor unit according to the dark currents is simple in structure, low in cost, and easy to implement. In addition, since the dark event rate in the sensor unit is high, a large amount of reference data may be obtained in a shorter period of time, such that the gain of the sensor unit may be determined quickly, accurately, and efficiently, which is advantageous for subsequent compensation for the change in the gain of the sensor unit.

Although the principles and applications of the embodiment of the present invention are described herein with reference to SiPM, it should be understood that the present invention is not limited thereto. The apparatus and method for measuring the gain of the sensor provided by the embodiments may also be applied to a PMT or any other suitable photoelectric sensor.

The present invention has been described with reference to the above embodiments, but it should be understood that the embodiments described above are for purposes of illustration and description only and are not intended to limit the present invention to the scope of the described embodiments. In addition, those skilled in the art may understand that the present invention is not limited to the foregoing embodiments, and more variations and modifications may be made based on the teachings for the present invention. These variations and modifications all fall within the scope of the present invention. The protection scope of the present invention is defined by the appended claims and their equivalent scopes.

What is claimed is:

1. An apparatus for measuring a gain of a sensor, comprising a current detection circuit and a processing circuit, wherein,
an input end of the current detection circuit is used for connecting to an output end of a sensor unit; the current detection circuit is used for detecting a current signal output by the sensor unit and generating a corresponding detection signal;
an input end of the processing circuit is connected to an output end of the current detection circuit; the processing circuit is used for calculating energy of dark events occurring in the sensor unit according to the detection signal, generating an energy spectrogram of the dark events, and calculating a gain of the sensor unit based on the energy spectrogram, wherein the processing circuit is further used for calculating energy $E_0$ of an effective event occurring in the sensor unit according to the detection signal, and correcting the energy $E_0$ of the effective event according to the following formula:

$$E=E_0*G_0/G,$$

in which, E is the corrected energy, G is the gain, and $G_0$ is a predetermined constant.

2. The apparatus according to claim 1, wherein the detection signal is a digital signal which consists of high and low levels which are equal in duration, and a sum of all high levels in the digital signal is directly proportional to the integration of the current signal over time.

3. The apparatus according to claim 2, wherein the processing circuit calculates the energy of the dark events occurring in the sensor unit in the following manner:
determining whether a pulse event occurs according to an appearance rule of the high and low levels in the digital signal;
using the digital signal to calculate energy of the pulse event when it is determined that the pulse event occurs, till it is determined that the pulse event is ended according to the appearance rule of the high and low levels in the digital signal; and
judging whether the pulse event is an effective event or a dark event according to the energy of the pulse event, and determining the energy of the pulse event as the energy of the dark event if the pulse event is the dark event.

4. The apparatus according to claim 3, wherein the horizontal axis of the energy spectrogram represents energy of a dark event(s), and the vertical axis of the energy spectrogram represents the times the energy of the dark event(s) is obtained by calculating;
the processing circuit calculates the gain of the sensor unit in the following manner:
calculating the gain according to a horizontal coordinate of a first spectrum peak corresponding to energy of a single dark event in the energy spectrogram, or calculating the gain according to a difference between the horizontal coordinate of the first spectrum peak and a horizontal coordinate of a second spectrum peak corresponding to energy of two dark events in the energy spectrogram.

5. The apparatus according to claim 2, wherein the processing circuit calculates the energy of the dark events occurring in the sensor unit in the following manner:
determining a period(s) in which no effective event occurs according to the appearance rule of the high and low levels in the digital signal;
selecting a digital signal(s) generated within a predetermined period(s) from a digital signal(s) generated within the period(s) in which no effective event occurs; and
calculating the energy of the dark events according to the digital signal(s) generated within the predetermined period(s).

6. The apparatus according to claim 5, wherein the predetermined period(s) is set such that an average number of dark events within the predetermined period(s) meets a first preset condition; the horizontal axis of the energy spectrogram represents energy of a dark event(s), and the vertical axis of the energy spectrogram represents the times the energy of the dark event(s) is obtained by calculating; the energy spectrogram includes a plurality of spectrum peaks, and the N-th spectrum peak in the energy spectrogram is corresponding to energy of N dark events;
the processing unit calculates the gain of the sensor unit in the following manner:
calculating the gain according to a difference between horizontal coordinates of any two adjacent spectrum peaks in the energy spectrogram.

7. The apparatus according to claim 6, wherein the first preset condition is that the average number of dark events is less than 20.

8. The apparatus according to claim 5, wherein the predetermined period(s) is set such that an average number of dark events within the predetermined period(s) meets a second preset condition; the horizontal axis of the energy spectrogram represents energy of a dark event(s), and the vertical axis of the energy spectrogram represents the times the energy of the dark event(s) is obtained by calculating;
the processing circuit calculates the gain of the sensor unit in the following manner:
performing Gaussian fitting on the energy spectrogram to obtain a variance and a mean of the energy spectrogram, and dividing the variance by the mean to obtain the gain.

9. The apparatus according to claim 8, wherein the second preset condition is that the average number of dark events is greater than 20.

10. A device for measuring gains of sensors, comprising a plurality of apparatuses for measuring the gain of the sensor according to claim 1, which are in a one-to-one correspondence with a plurality of sensor units in a sensor array.

11. A method for measuring a gain of a sensor, comprising the following steps:
  detecting a current signal output by a sensor unit and generating a corresponding detection signal;
  calculating energy of dark events occurring in the sensor unit according to the detection signal;
  generating an energy spectrogram of the dark events;
  calculating a gain of the sensor unit based on the energy spectrogram
  calculating energy $E_0$ of an effective event occurring in the sensor unit according to the detection signal; and
  correcting the energy $E_0$ of the effective event according to the following formula:
  $$E=E_0*G_0/G,$$
  in which, E is the corrected energy, G is the gain, and $G_0$ is a predetermined constant.

12. The method according to claim 11, wherein the detection signal is a digital signal which consists of high and low levels which are equal in duration, and a sum of all high levels in the digital signal is directly proportional to the integration of the current signal over time.

13. The method according to claim 12, wherein the step of calculating the energy of the dark events occurring in the sensor unit includes:
  determining whether a pulse event occurs according to an appearance rule of the high and low levels in the digital signal;
  using the digital signal to calculate energy of the pulse event when it is determined that the pulse event occurs, till it is determined that the pulse event is ended according to the appearance rule of the high and low levels in the digital signal; and
  judging whether the pulse event is an effective event or a dark event according to the energy of the pulse event, and determining the energy of the pulse event as the energy of the dark event if the pulse event is the dark event.

14. The method according to claim 13, wherein the horizontal axis of the energy spectrogram represents the energy of a dark event(s), and the vertical axis of the energy spectrogram represents the times the energy of the dark event(s) is obtained by calculating;
  the step of calculating the gain of the sensor unit includes:
    calculating the gain according to a horizontal coordinate of a first spectrum peak corresponding to energy of a single dark event in the energy spectrogram, or calculating the gain according to a difference between the horizontal coordinate of the first spectrum peak and a horizontal coordinate of a second spectrum peak corresponding to energy of two dark events in the energy spectrogram.

15. The method according to claim 12, wherein the step of calculating the energy of the dark events occurring in the sensor unit includes:
  determining a period(s) in which no effective event occurs according to the appearance rule of the high and low levels in the digital signal;
  selecting a digital signal(s) generated within a predetermined period(s) from a digital signal(s) generated within the period(s) in which no effective event occurs; and
  calculating the energy of the dark events according to the digital signal(s) generated within the predetermined period(s).

16. The method according to claim 15, wherein the predetermined period(s) is set such that an average number of dark events within the predetermined period(s) meets a first preset condition; the horizontal axis of the energy spectrogram represents energy of a dark event(s), and the vertical axis of the energy spectrogram represents the times the energy of the dark event(s) is obtained by calculating; the energy spectrogram includes a plurality of spectrum peaks, and the N-th spectrum peak in the energy spectrogram is corresponding to energy of N dark events;
  the step of calculating the gain of the sensor unit includes:
    calculating the gain according to a difference between horizontal coordinates of any two adjacent spectrum peaks in the energy spectrogram.

17. The method according to claim 15, wherein the predetermined period(s) is set such that an average number of dark events within the predetermined period(s) meets a second preset condition; the horizontal axis of the energy spectrogram represents energy of a dark event(s), and the vertical axis of the energy spectrogram represents the times the energy of the dark event(s) is obtained by calculating;
  the step of calculating the gain of the sensor unit includes:
    performing Gaussian fitting on the energy spectrogram to obtain a variance and a mean of the energy spectrogram; and
    dividing the variance by the mean to obtain the gain.

18. The method according to claim 16, wherein the first preset condition is that the average number of dark events is less than 20.

19. The method according to claim 17, wherein the second preset condition is that the average number of dark events is greater than 20.

* * * * *